Sept. 23, 1969  E. J. OTKEN  3,468,265
APPARATUS FOR MAKING FROZEN COMESTIBLES
Filed July 15, 1966  10 Sheets-Sheet 1

FIG. 1

INVENTOR
EDWIN J. OTKEN
BY
Brumbaugh, Free, Graves & Donohue
his ATTORNEYS

FIG. 2

Sept. 23, 1969  E. J. OTKEN  3,468,265
APPARATUS FOR MAKING FROZEN COMESTIBLES
Filed July 15, 1966  10 Sheets-Sheet 4

INVENTOR
EDWIN J. OTKEN

Brumbaugh, Free, Graves + Donohue his ATTORNEYS

Sept. 23, 1969　　　　　　　E. J. OTKEN　　　　　　　3,468,265
APPARATUS FOR MAKING FROZEN COMESTIBLES
Filed July 15, 1966　　　　　　　　　　　　　　　10 Sheets-Sheet 6

INVENTOR
EDWIN J. OTKEN his ATTORNEYS

INVENTOR.
EDWIN J. OTKEN

Sept. 23, 1969  E. J. OTKEN  3,468,265
APPARATUS FOR MAKING FROZEN COMESTIBLES
Filed July 15, 1966  10 Sheets-Sheet 10

INVENTOR.
EDWIN J. OTKEN
BY
his ATTORNEYS

United States Patent Office 3,468,265
Patented Sept. 23, 1969

3,468,265
APPARATUS FOR MAKING FROZEN COMESTIBLES
Edwin J. Otken, North Brunswick, N.J., assignor to Good Humor Corporation, Brooklyn, N.Y., a corporation of Delaware
Filed July 15, 1966, Ser. No. 565,620
Int. Cl. A23g 5/02
U.S. Cl. 107—1                      6 Claims

ABSTRACT OF THE DISCLOSURE

A system for simultaneously making a plurality of different frozen comestibles by simultaneously placing a different one of a plurality of different edible ingredients in a plurality of molds to be frozen in the molds.

---

This invention relates to a method and apparatus for making frozen comestibles and, more particularly, to a method and apparatus for simultaneously making frozen comestibles of different ingredients or combinations of ingredients.

Frozen confections such as ice cream, sherbert, ices and the like have been supplied in a wide variety of flavors in containers as well as in the form of an "ice cream stick." It is also well known in the art to produce multi-flavored frozen confections, and apparatus for making such comestibles are shown in my copending application Ser. No. 336,912, filed Jan. 10, 1964, and now U.S. Patent No. 3,279,393, granted October 18, 1966.

The consumer has been able to purchase a package of six or twelve ice cream bars, for example, but all of the bars in each package have been of the same flavor. It would be very convenient for the consumer if he could purchase a carton containing frozen confection bar of a variety of flavors and combinations of flavors, but it would be a very costly operation if conventional ice bar freezers were used to produce the various frozen bars for each package. Thus, a number of conventional machines would be set up to produce different frozen confections, and then the outputs of the various machines would have to be assembled as a separate operation.

It is an object of the present invention to provide a novel method and apparatus for simultaneously making a plurality of different frozen comestibles. Furthermore, the apparatus according to the invention is adapted to make a variety of different single-flavored or multi-flavored confections simultaneously.

More particularly, in accordance with the invention predetermined amounts of edible ingredients are simultaneously dispensed from each of a plurality of reservoirs for the ingredients and are discharged into a plurality of molds to be frozen in the molds to form a plurality of differing frozen comestibles. Means are provided for selectively communicating the reservoirs with the molds to provide a plurality of different single-flavored or multi-flavored comestibles, as desired.

All of the above is more fully explained in the detailed description of the preferred embodiment of the invention which follows, this description being illustrated by the accompanying drawings wherein:

Figure 1:
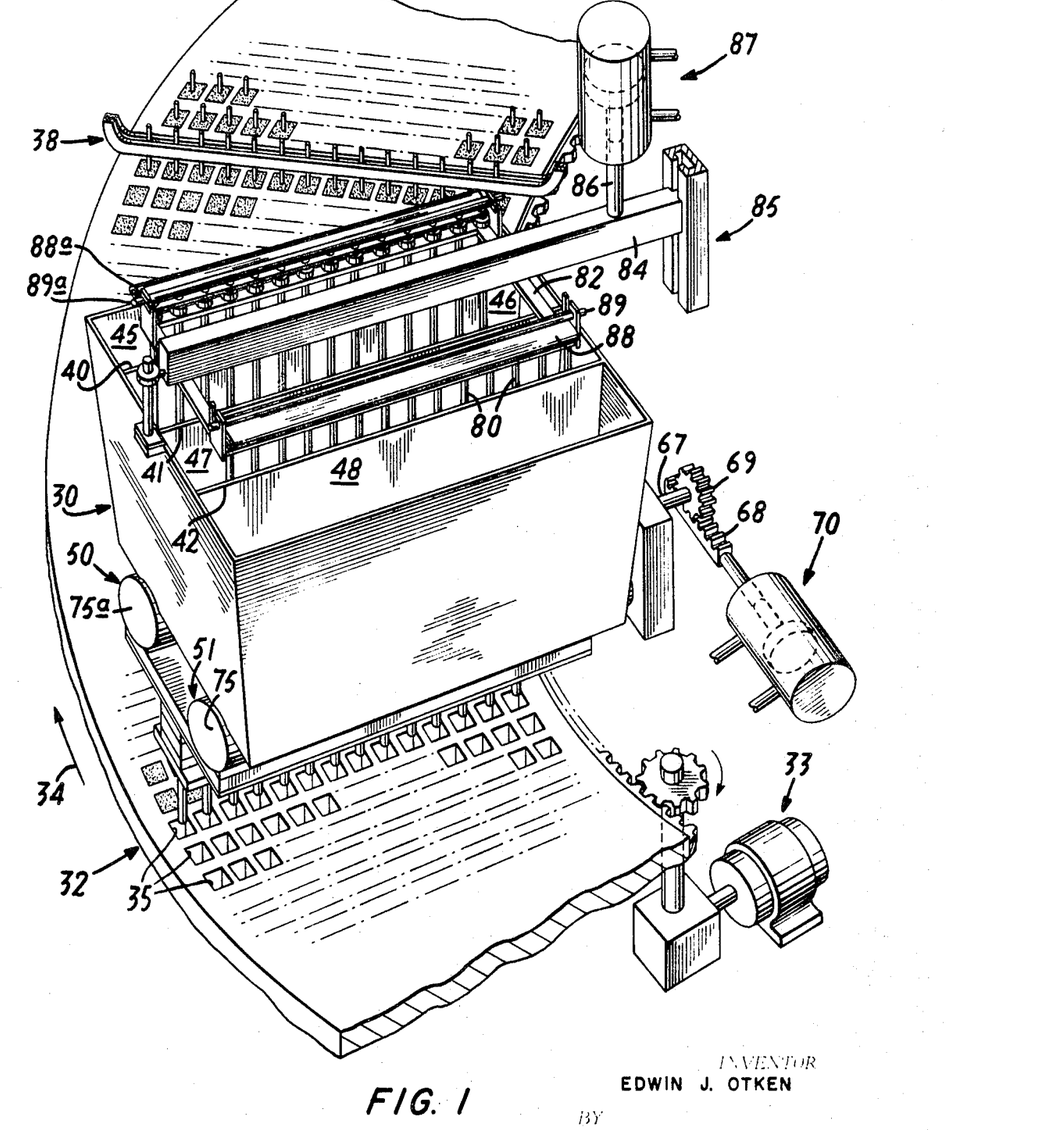
FIG. 1 is a simplified perspective view of a typical apparatus for making frozen comestibles according to the present invention.

In the representative embodiment of the invention shown by way of example in FIG. 1, a hopper 30 is disposed by any suitable support means (not shown) above a conventional rotary horizontal freezer 32. Such freezers are manufactured by the Gram Corporation of Vojens, Denmark. Freezer 32 is rotated by a suitable conventional drive motor 33 in the direction shown by the arrow 34 and includes a plurality of individual molds or pockets 35 which are arranged in radial rows of fourteen pockets in the embodiment illustrated. The Gram freezer includes suitable means (not shown) for circulating cold brine around the molds 35 to freeze the ingredients discharged therein from the hopper 30, as is well known in the art.

If "ice cream on a stick" is to be produced, the sticks are inserted into the ice cream bars by suitable conventional apparatus shown at 38. As is well known in the art, warm brine is then circulated around the molds 35 so that the frozen comestibles can be readily extracted from the molds by suitable conventional apparatus (not shown). Thereafter, the frozen bars may be dipped into another ingredient in order to apply an outer coating to the bar, if desired. All of the above, with the exception of the hopper 30, are included in the automatic ice bar freezer made by the Gram Corporation, and so a detailed discussion of this equipment is not necessary.

The hopper 30 is preferably made of stainless steel and includes three vertically disposed stainless steel internal walls 40, 41 and 42 which divide the hopper 30 into four reservoirs 45, 46, 47 and 48 for containing the edible ingredients to be discharged into the molds 35.

Disposed beneath the reservoirs 45 and 46 is a free or floating piston type measuring dispenser 50, and beneath the reservoirs 47 and 48 is another free piston type measuring dispenser 51. The measuring dispensers 50 and 51 are identical, and so only one need be described. The dispenser 51 includes a stainless steel cylinder 53 (see FIGS 2 and 3) mounted for rotation about a horizontal axis within a horizontal cylindrical housing 54 of stainless steel. The rotatable cylinder 53 is provided with fourteen aligned radial cylindrical passageways 56 therethrough, each of which is adapted to slidably receive a floating measuring piston 58. Each measuring piston is provided with a rubber O-ring 60 which insures a liquid-tight seal between each measuring piston and its corresponding passageway 56.

Figure 2:
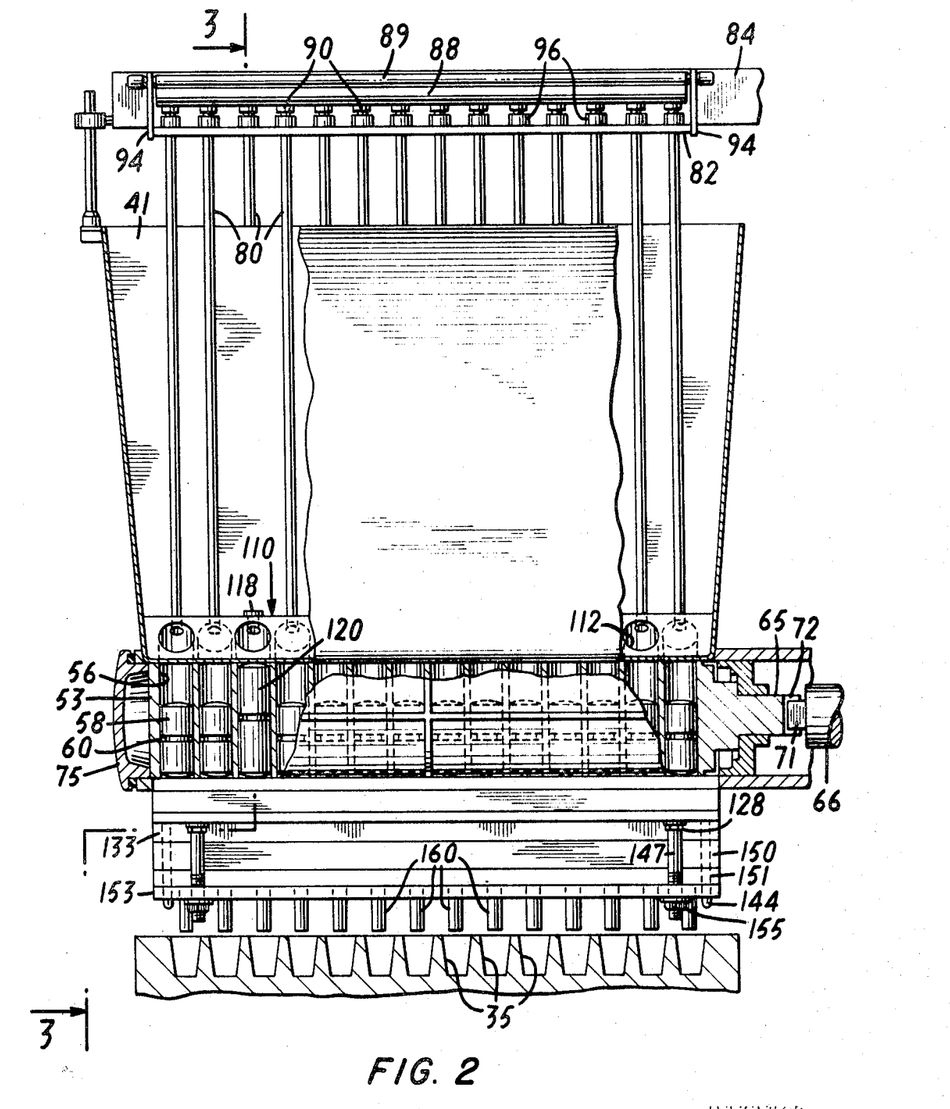
FIG. 2 is a sectional view of a portion of the apparatus of FIG. 1 showing means for dispensing measured amounts of ingredients for the comestibles.
Figures 3, 3A:
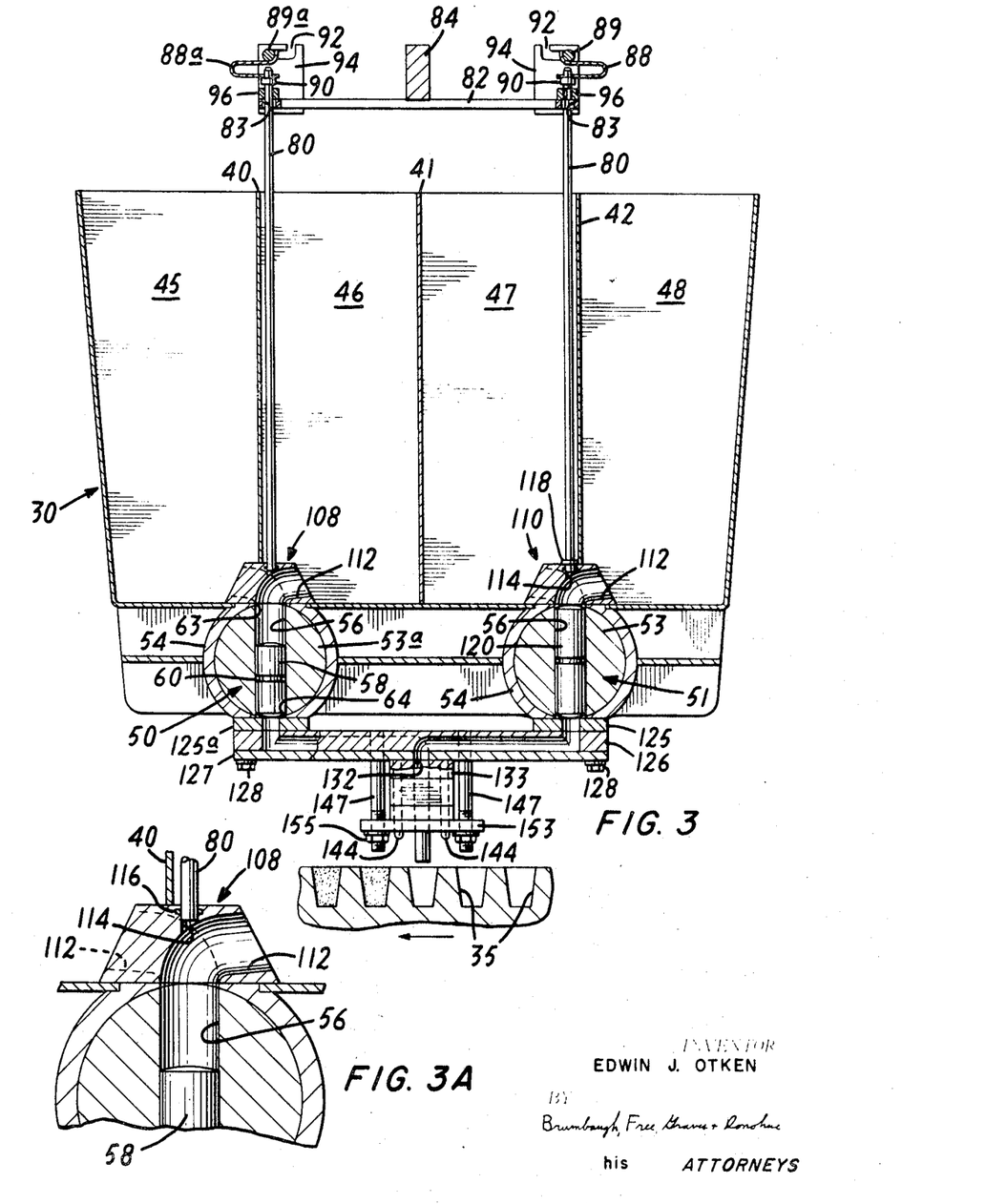
FIG. 3 is a sectional view taken along the line 3—3 of FIG. 2 and looking in the direction of the arrows.
FIG. 3A is an enlarged view in section of a portion of the apparatus of FIG. 3.
Figure 4:
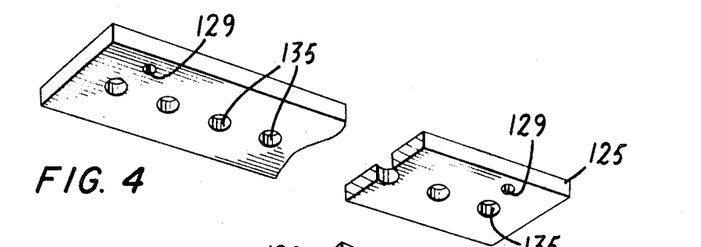
FIGS. 4 through 6 are perspective views from below of distributing plates which are mounted on the ingredients-containing hopper and which channel the outputs of the dispensing means to an aligned row of outlets at the bottom of the hopper.

The housing 54 is provided with an entrance orifice 63 and an exit orifice 64 for each of the passageway 56, the exit orifice 64 having a somewhat smaller radius than that of the corresponding passageway 56 in order to prevent the measuring piston 58 from being accidentally displaced outside of the interior cylindrical surface of the housing 54.

The measuring cylinder 53 is rotated through a shaft 65 which is secured thereto, which in turn is driven through a shaft 66 and suitable gears (not shown) by a shaft 67 which is mechanically coupled to a rack 68 and pinion 69 by a suitable conventional hydraulic drive 70. The shaft 66 is formed with a key 71 which is received in a slot 72 in the shaft 65, so that the cylinder 53 may be easily decoupled from the shaft 66. Similarly, the feed cylinder 53a is mechanically coupled by suitable shafts and gears (not shown) to the shaft 67 so that the two feed cylinders 53 and 53a are simultaneously rotated by the hydraulic drive 70 through 180° between two positions in which the passageways 56 of each feed cylinder are vertically disposed in alignment with the corresponding entrance orifices 63 and exit orifices 64. By removing a pair of cover plates 75 and 75a, the feed cylinders 53 and 53a may be withdrawn from the housings 54 for inspection and cleaning of the passageways 56 and the measuring pistons 58 as necessary.

Fourteen vertically disposed pushrods 80 are removably mounted on a horizontal support member 82 in alignment with the inlet orifices 63 for the measured feed means 51. It may be seen in FIG. 2 that the third pushrod from the left has been removed for a purpose to be explained hereinafter. Similarly, fourteen additional pushrods 80 are removably mounted on the support member 82 in alignment with the inlet orifices 63 for the measuring dispenser 50. The pushrods 80 are slidably received in a plurality of bores 83 in the support member 82. The support member 82 is secured to a main support member 84 which is slidably mounted at one end in a vertical guideway 85 and which may be raised and lowered by a rod 86 driven by a suitable conventional hydraulic drive system 87.

Each pushrod 80 is driven in the downward direction through one of a pair of leaf springs 88 and 88a, which bear at one end against a pair of horizontal rods 89 and 89a, respectively, removably mounted on the support member 82 and bear at the opposite end against a collar 90 secured to each pushrod. Each end of the horizontal rods 89 and 89a is slidably received in a slot 92 formed in each one of a pair of brackets 94 secured to each end of the support member 82. Selected ones of the pushrods 80 may be removed by first compressing the corresponding one of the leaf springs 88 and 88a, and then removing the corresponding one of the rods 89 and 89a. After removing the leaf spring, the desired ones of the pushrods are readily removed by withdrawing them upwardly out of the bores 83. The pushrods 80 are driven in the upward direction by the support member 82 which acts through a rubber collar 96 against each collar 90.

A pair of discharge manifolds 108 and 110 are provided at the base of the dividing walls 40 and 42, respectively, and each of the discharge manifolds is formed with fourteen discharge ports 112 through which the edible ingredients exit from the reservoirs 45–48. In particular, adjacent discharge ports 112 of the discharge manifold 108 communicate with different ones of the reservoirs 45 and 46, while adjacent discharge ports of the manifold 110 communicate with different ones of the reservoirs 47 and 48. Each of the discharge manifolds is also provided with fourteen bores 114 which slidably receive the lower ends of the pushrods 80. Rubber O-rings 116 are provided in the bores 114 in order to provide a liquid-tight seal between the pushrods and the bores.

A plurality of plugs 118 are provided which may be removably inserted into the ones of the bores 114 from which pushrods 80 have been removed (see FIG. 2) in order to prevent the passage of ingredients between the reservoirs 45 and 46 and between the reservoirs 47 and 48 through the discharge ports 112 which communicate with the reservoirs 45 and 48, respectively. The measuring pistons 58 are removed from the passageways 56 corresponding to the removed pushrods 80 by first withdrawing the corresponding one of the feed cylinders 53 and 53a from the housing 54, after which the particular pistons are readily pushed out of the passageways. A plug 120 is then inserted into each of these passageways, and the feed cylinder is returned to its normal position within the housing 54. In this way the measuring dispensers 50 and 51 may be deactivated with respect to selected ones of the passageways 56 for reasons to be discussed below.

If desired, agitator paddles (not shown) may be mounted on the support member 84 for reciprocation therewith in order to agitate the ingredients in the reservoirs 45–48 to insure that the ingredients have a uniform consistency. Also, suitable heat exchanger coils (not shown) may be disposed in the reservoirs 45–48 in order to heat or cool the ingredients therein, if necessary.

The measuring dispensers 50 and 51 operate to dispense predetermined amounts of ingredients through the outlet orifices 64 in the following manner. When a radial row of molds 35 is beneath the discharge nozzles (to be discussed below) mounted below the hopper 30, the hydraulic drive system 87 is actuated by suitable means (not shown) to drive the pushrods 80 in the downward direction. The pushrods pass through the discharge ports 112 and inlet orifices 63 to drive the measuring pistons 58 downwardly until they abut the rim of the outlet orifices 64, at which time the leaf springs 88 and 88a flex during the relatively small additional downward travel of the support members 82 and 84. This flexing of the leaf springs insures that the measuring pistons are positively driven against the rim of the outlet orifices 64.

As the measuring pistons 58 are driven downwardly, the ingredients in the chambers 56 below the measuring pistons are driven through the outlet orifices 64. At the same time additional ingredients are drawn from the reservoirs 45–48 through the discharge ports 112 and into the portion of the chambers 56 above the measuring pistons. Measured charges are thus driven from the outlet orifices 64 through the multiple orifice nozzle means to be discussed below and into the radial row of molds 35. The simultaneous ejection of measured charges of ingredients is insured, because the engagement between the O-rings 60 on the measuring pistons 58 and the walls of the measuring chambers 56 prevents the pistons from slipping when they are not being driven by the pushrods 80, and so the pistons are simultaneously displaced when contact is made therewith by the pushrods.

As the filled row of molds passes from beneath the nozzles, suitable conventional means (not shown) actuates the hydraulic drive system 87 to raise the pushrods 80 and thereafter actuate the hydraulic drive system 70 to rotate the feed cylinders 53 and 53a 180° to a position in which the measuring pistons 58 are adjacent the inlet orifices 63. Then the hydraulic drive system 87 is actuated to drive the pushrods 80 downwardly pushing the measuring pistons 58 to discharge a measured charge of ingredients into each one of the next radial row of molds 35, and the cycle is then repeated. A detailed discussion of the mechanism for rotating the feed cylinders and reciprocating the pushrods in proper timed relation to the rotation of the freezer 32 is not necessary, inasmuch as a similar free piston type measuring dispenser with measuring pistons and pushrods is included in the automatic ice bar freezer produced by the above-mentioned Gram Corporation. Furthermore, it is apparent that conventional electric motors controlled by suitable limit switches and reversing relays could be substituted for hthe hydraulic drive systems 70 and 87, if desired.

Four stainless steel distributing plates 125, 125a, 126 and 127 are secured to the housings 54 by a plurality of screws 128 which are slidably received in a plurality of bores 129 through the plates. The distributing plates channel the fourteen outlets from each of the measuring dispensers 50 and 51 to an aligned row of twenty-eight outlet ports 132 in a base plate 133. Each of the distributing plates 125 and 125a is formed with fourteen ports 135 which are coaxial with the corresponding ones of the outlet orifices 64.

Figure 5:
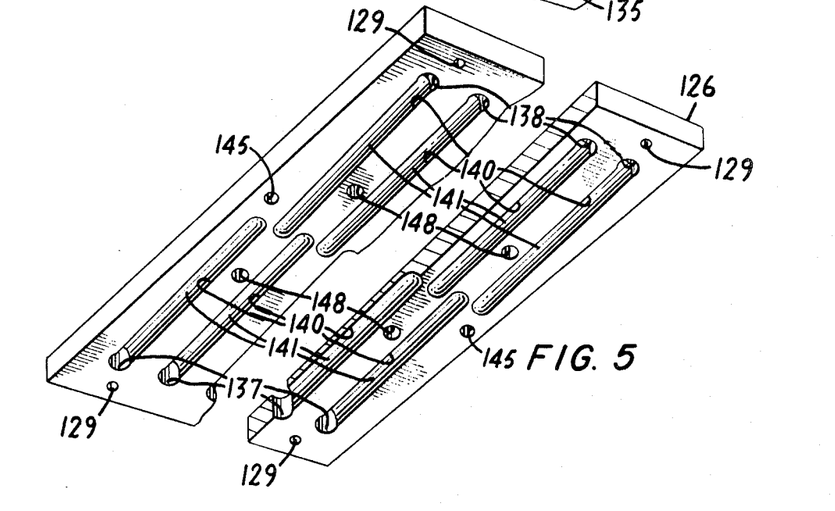

The distributing plate 126 is disposed immediately below the two plates 125 and 125a to form liquid-tight seals therewith. The distributing plate 126 is provided with two rows 137 and 138 of fourteen ports each which are in communication with the corresponding ones of the ports 135 in the two plates 125 and 125a. The ports 137 and 138 communicate with the measuring dispensers 50 and 51, respectively. The lower surface of the distributing plate 126 is formed with twenty-eight recessed slots 140 which extend from the ports 137 and 138 to the central portion of the plate 126 so that the inner ends of the slots 140 communicating with the two measuring dispensers 50 and 51 are substantially aligned in an alternating fashion as best seen in FIG. 5. Each slot 140 has a top closure wall 141 so that the slots 140 are enclosed at top and bottom by the closure walls 141 and the distributing plate 127, respectively.

Figure 6:
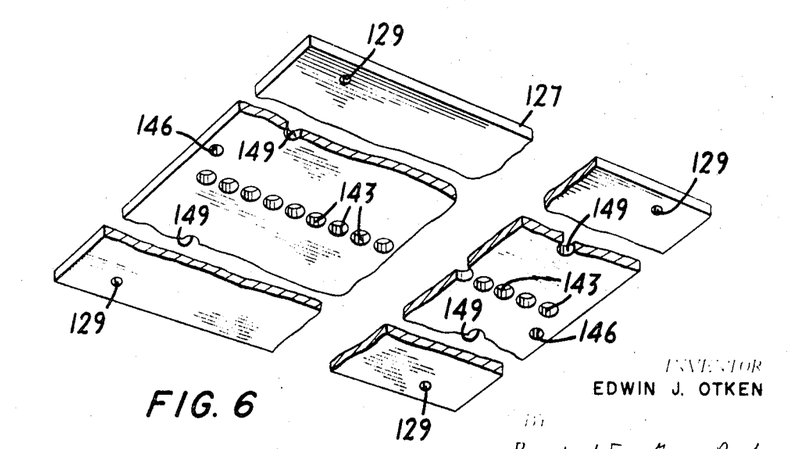

The distributing plate 127 is formed with twenty-eight aligned ports 143 which communicate with the inner aligned ends of the slots 140 of the plate 126. The base plate 133 is mounted beneath the distributing plate 127 so that the twenty-eight discharge ports 132 of the base plate 133 are in registry with the twenty-eight ports 143 of the distributing plate 127 by means of a pair of guide posts 144 which are threadedly received in a pair of bores 145 in the plate 126. The guide posts 144 are slidably received in a pair of bores 146 in the plate 127 and a pair of bores (not shown) in the base plate 133. A plurality of mounting posts 147 are threadedly received in a plurality of bores 148 in the plate 126 and slidably received in a plurality of bores 149 in the plate 127 for a purpose to be discussed below.

Figures 7, 10:
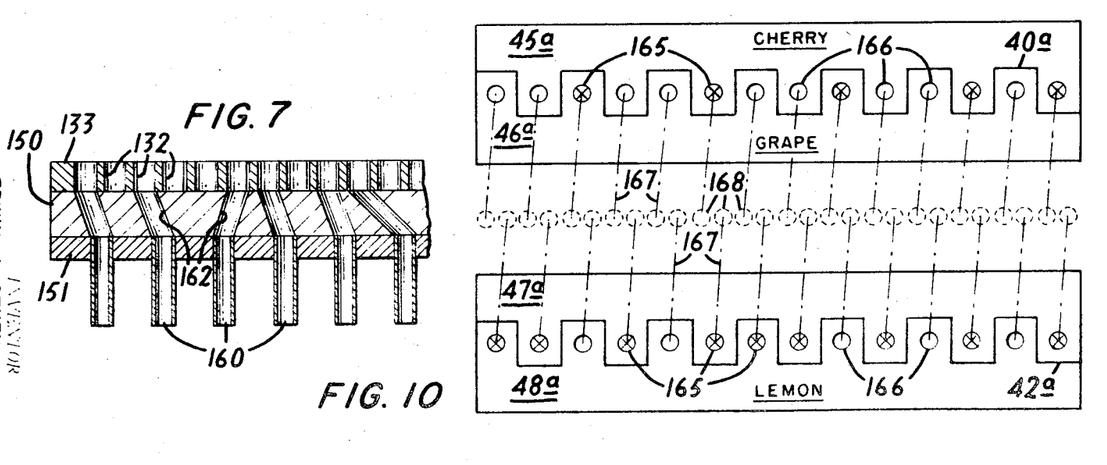
FIG. 7 is an assembled view in section of a first set of distribution plates adapted to be releasably mounted below the distributing plate of FIG. 6 for discharging the ingredients into the molds.
FIG. 10 is a schematic diagram showing the arrangement of blocked and open measuring channels of the dispensing means when the distribution plates of FIG. 7 are used.

FIG. 7 shows a pair of distribution plates 150 and 151 comprising a first multiple orifice nozzle mounted on the base plate 133 for discharging one of three different edible ingredients into each of the molds 35. The distribution plates 150 and 151 are held against the base plate 133 so as to provide liquid-tight seals between these plates by means of a retainer plate 153 (see FIG. 2) which is anchored by means of a plurality of nuts 155 which threadedly engage the mounting posts 147. The distribution plates 150 and 151 are maintained in registration with each other and with the base plate 133 by means of the guide posts 144 which are slidably received by the distribution plates. The distribution plate 151 is formed with fourteen depending tubes or nozzles 160 which are centered on the loci of the midpoints of the fourteen molds 35 comprising each radial row of molds in the freezer 32. In this way the ingredients are always discharged into the centers of the molds 35.

Figure 8:
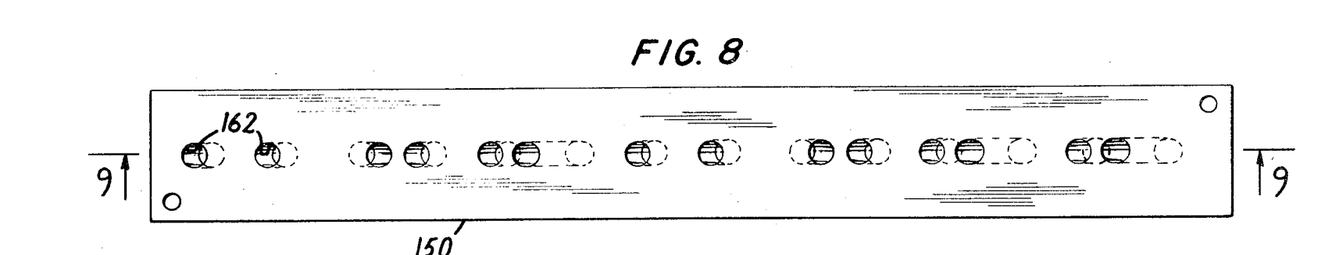
FIG. 8 is a plan view of one of the distribution plates of FIG. 7.
Figure 9:
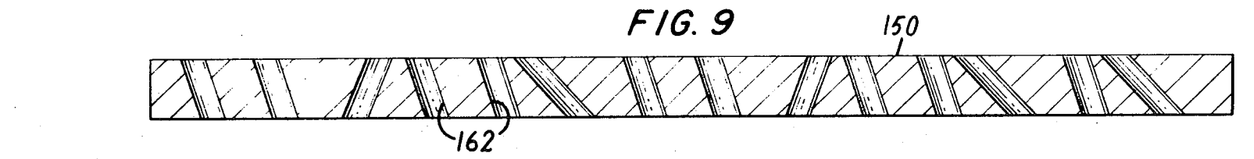
FIG. 9 is a sectional view taken along the line 9—9 of FIG. 8 and looking in the direction of the arrows.

The distribution plate 150 is formed with fourteen inclined bores 162 which communicate fourteen of the ports 132 of the base plate 133 with the fourteen nozzles 160. FIGS. 8 and 9 show in greater detail the arrangement of the bores 162 of the distribution plate 150. The remaining fourteen of the ports 132 are blocked by the distribution plate 150. The elements of the measuring dispensers 50 and 51 corresponding to the ones of the ports 132 which are blocked by the distribution plate 150 are deactivated by replacing the corresponding ones of the measuring pistons 58 with the plugs 120 and by removing the corresponding ones of the pushrods 80. In addition, the corresponding bores 114 are sealed by the plugs 118 so as to prevent intermixing of ingredients through the bores 114 and discharge ports 112 between the reservoirs 45 and 46 or between the reservoirs 47 and 48.

FIG. 10 is a schematic diagram which shows which ones of measuring channels 56 have been blocked by the plugs 120 in order to discharge one of three different ingredients into each mold 35 by means of the distribution plates 150 and 151. The blocked measuring channels 56 are indicated by an "x" as at 165, while the measuring channels through which measured amounts of ingredients are dispensed are indicated at 166. The slots 140 in the distributing plate 126 and the ports 132 of the base plate 133 are indicated in phantom at 167 and 168, respectively. The dividing walls 40 and 42 are schematically illustrated at 40a and 42a, respectively, and the reservoirs 45, 46, 47 and 48 are indicated at 45a, 46a 47a and 48a, respectively.

In the illustrative example cherry ice cream is contained in the reservoir 45, grape ice cream in the reservoir 46, and lemon ice cream in the reservoir 48, the reservoir 47 is not being used. The arrangement of the slots 140 in the distributing plate 126 (see FIG. 5) is such that the first port 137 from the left (as viewed in FIG. 5) is communicated to the first port 132 from the left (see FIG. 7) of the base plate 133. Due to the arrangement of the discharge ports 112 from the reservoirs 45 and 46, grape ice cream is conducted from the reservoir 46 through the first port 137, the first port 132, the first bore 162 and the first nozzle 160 into the first mold 35. The first port 138, which would normally feed the ingredient from the reservoir 48, communicates with the second port 132 which is blocked by the distribution plate 150 as seen in FIG. 7 and indicated in FIG. 10. The second port 137 supplies cherry ice cream from the reservoir 45 through the third port 132, the second bore 162 and the second nozzle 160 into the second mold 35. The second port 138 communicates through the fourth port 132 which is blocked by the distribution plate 150, and the third port 138 communicates lemon ice cream from the reservoir 48 through the sixth port 132, the third bore 162 and third nozzle 160 into the third mold 35. Thus the distribution plates 150 and 151 comprise a multiple orifice nozzle for simultaneously discharging one of three edible ingredients into each of the molds 35 in order to simultaneously produce three different single-flavored frozen ice cream bars.

Figure 11:
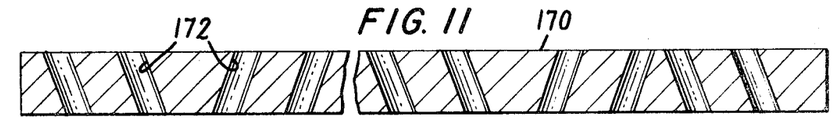
FIG. 11 is a sectional view of another distribution plate adapted to be releasably mounted below the hopper for communicating the dispensing means with the molds according to a different arrangement.
Figure 12:
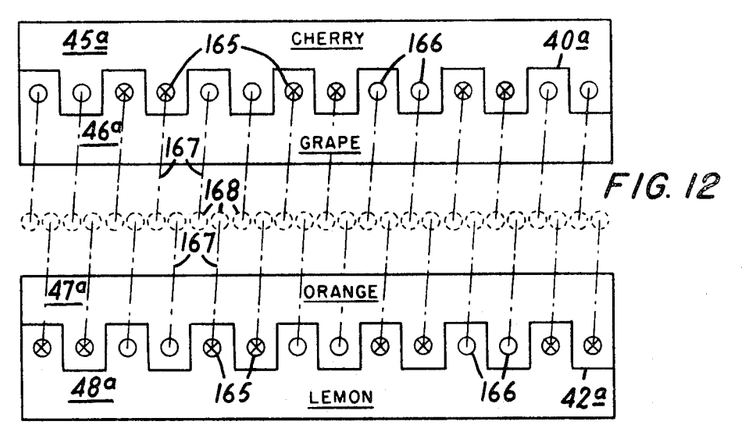
FIG. 12 is a schematic diagram showing the open and blocked measuring channels when the dispensing means feed the distribution plate of FIG. 11.

One of four different ingredients may be inserted into each of the molds 35 by substituting the distribution plate 170 shown in FIG. 11 for the distribution plate 150 described above. The distribution plate 170 is formed with fourteen inclined bores 172 which communicate a different combination of fourteen of the ports 132 of the base plate 133 with the fourteen nozzles 160 of the distribution plate 151. As may be seen in the schematic diagram of FIG. 12, a fourth ingredient, orange ice cream, is supplied from the reservoir 47. The same reference numerals are used in FIG. 12 as were used in FIG. 10. The manner in which the four ingredients are discharged into the molds 35 is apparent from FIGS. 11 and 12 in view of the above discussion in conjunction with FIGS. 7–10.

Figure 13:
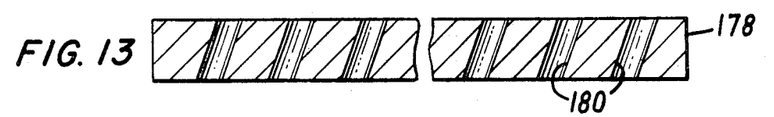
FIG. 13 is a sectional view of still another distribution plate in accordance with the invention.
Figure 14:
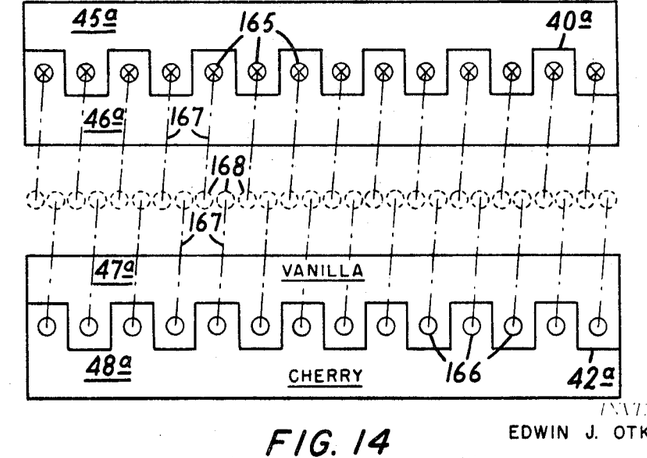
FIG. 14 is a schematic diagram showing the state of the measuring channels when the distribution plate of FIG. 13 is in use.

If one of only two ingredients is to be inserted into each mold, the stainless steel distribution plate 178 of FIG. 13 is substituted for the distribution plate 150 or 170. The distribution plate 178 is formed with fourteen inclined bores 180 which are arranged to communicate still another combination of fourteen of the ports 132 with the fourteen nozzles 160. In this case, the reservoirs 45 and 46 are not used, and so all of the measuring channels 56 are blocked in the dispenser 50. Accordingly, the dispenser 51 supplies ingredients thorugh all fourteen of its measuring channels, as indicated in FIG. 14.

Figure 15:
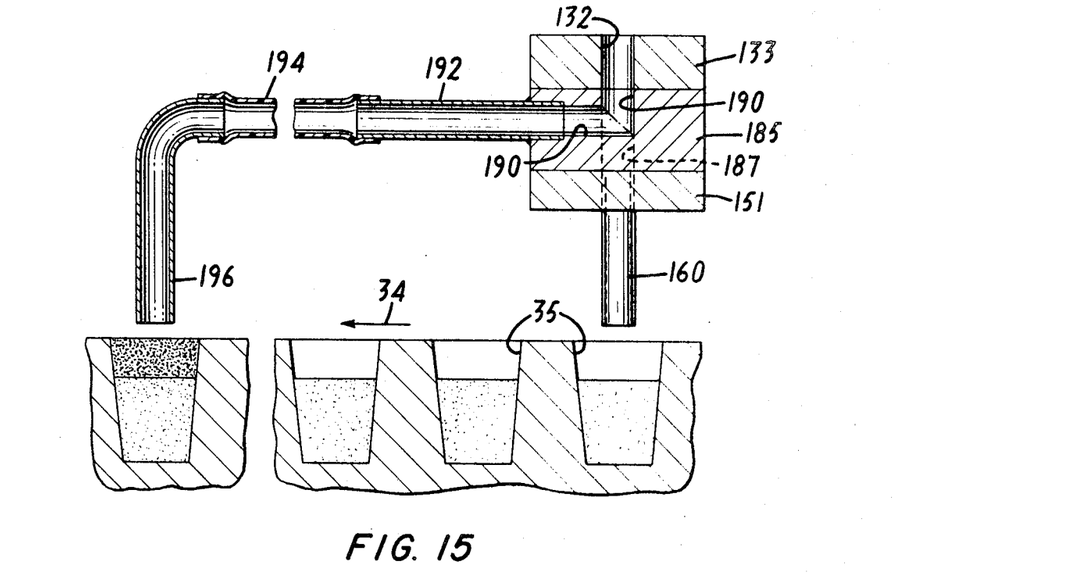
FIG. 15 is a partial sectional view of apparatus for simultaneously making different multi-flavored frozen comestibles.
Figure 16:
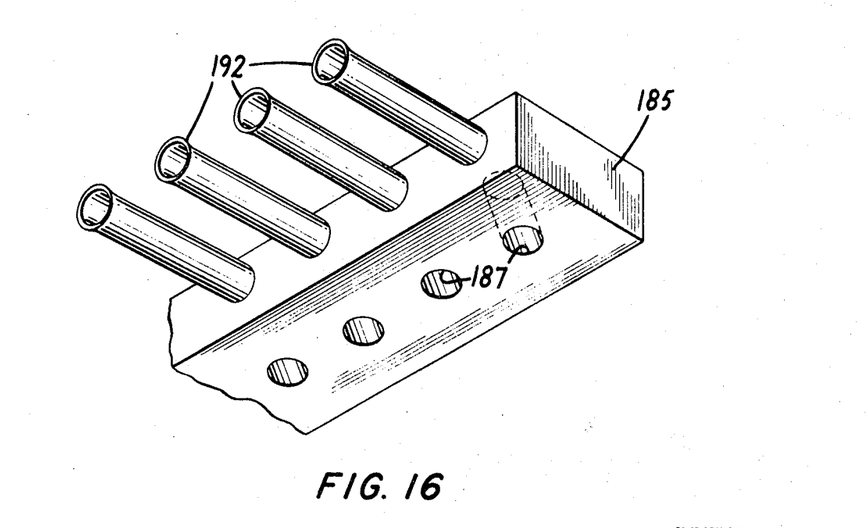
FIG. 16 is a perspective view of a distribution plate in the apparatus of FIG. 15.

FIGS. 15 and 16 show apparatus according to the present invention for simultaneously producing two different frozen comestibles each of which contains a different combination of two ingredients. A stainless steel distribution plate 185 is substituted for the distribution plate 150, 170 or 178 and is used with the distribution plate 151 to comprise another multiple orifice nozzle. The distribution plate 185 is formed with fourteen inclined bores 187 which communicate the first, third, fifth, seventh, etc. of the ports 143 and the ports 132 as viewed in FIGS. 6 and 7, respectively, with the fourteen nozzles 160 of the distribution plate 151. A somewhat larger measuring piston is substituted for each of the measuring pistons 58 described above, so that a smaller charge of ingredient is discharged into each of the molds 35.

Figure 17:
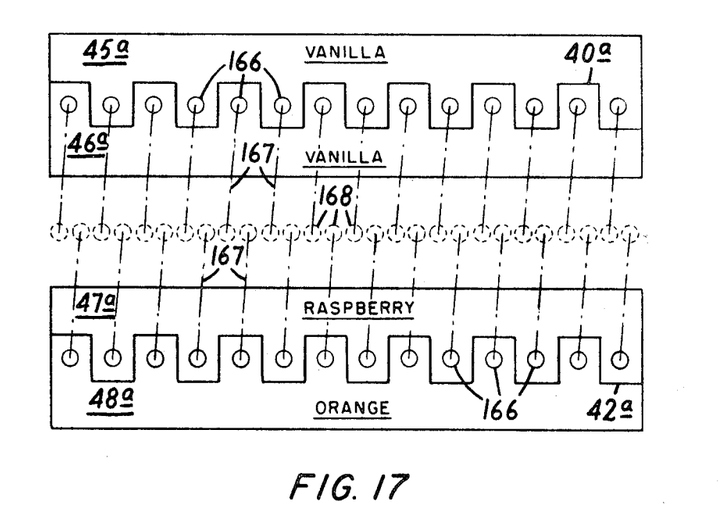
FIG. 17 is a schematic diagram showing the open and blocked measuring channels when the distribution plate of FIG. 16 is in use.

As is evident from the schematic diagram of FIG. 17 and the arrangement of the slots 140 in the distributing plate 126 (see FIG. 5), the nozzles 160 discharge the ingredients in the reservoirs 45 and 46, which might both contain vanilla ice cream for example, into the empty molds to partially fill them with vanilla ice cream. Alternatively, the reservoirs 45 and 46 could contain different ingredients, in which case the two ingredients in the reservoirs 45 and 46 would be discharged into alternate ones of the molds 35.

The distribution plate 185 is also formed with fourteen substantially L-shaped bores 190 which communicate the remaining fourteen of the ports 132 with fourteen tubes 192 disposed substantially perpendicularly of the bores 187 and the nozzles 160. Each of the tubes 192 is communicated by means of a plastic tube 194 with a discharge nozzle 196 which is disposed above a different one of the fourteen molds in a radial row which is spaced by thirty radial rows, for example, downstream of the radial row of molds then beneath the nozzles 160.

The adjacent ones of the nozzles 196 are communicated with a different one of the reservoirs 47 and 48, which may contain raspberry ice and orange ice, for example. In this way, while the lower portion of the molds beneath the nozzles 160 are filled with vanilla ice cream, the remaining portion of the molds beneath the nozzles 196 are filled with either raspberry or orange ice, thus producing two different frozen ice cream bars each of which contains a different combination of two flavors. The nozzles 196 are spaced from the nozzles 160 so that the vanilla ice cream is frozen in the lower portion of the molds before the orange and raspberry ice are added, thus insuring that the flavors are not intermixed.

Figure 18:
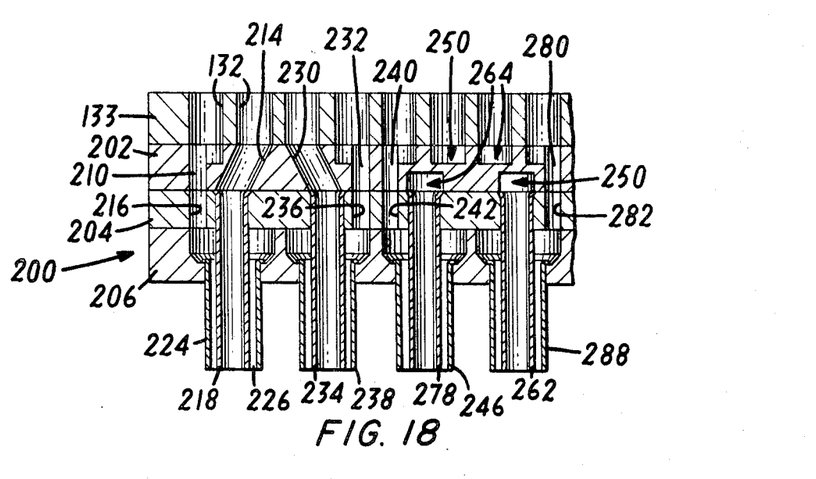
FIG. 18 is an assembled view in section of still another set of distribution plates for simultaneously discharging two ingredients into each mold so as to make a variety of multi-flavored frozen comestibles.

FIGURE 18 shows a multiple orifice nozzle 200 mounted on the base plate 133 for simultaneously discharging two ingredients into each of the molds 35 to produce four different comestibles each of which contains a different combination of two ingredients. The frozen bars produced by the nozzle 200 have an inner core of one flavor and a layer around the inner core of a differing flavor.

Figure 20:
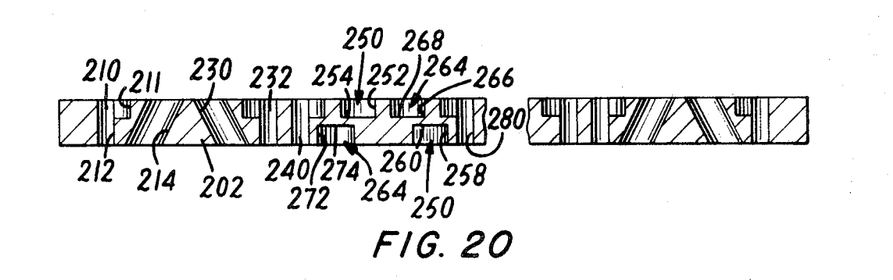
Figure 21:
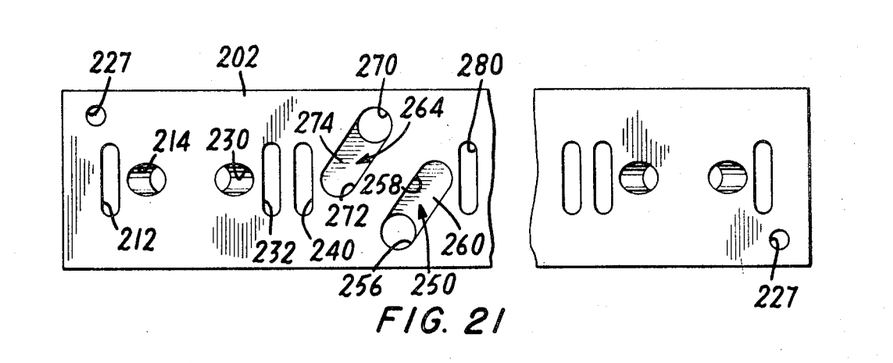

The nozzle 200 includes three distribution plates 202, 204 and 206. The upper distribution plate 202 is formed with a first passageway 210 therethrough the upper portion of which includes a partially circular inlet space 211 which is aligned with the first port 132 of the base plate 133 as seen from the left in FIG. 18. The inlet space 211 communicates with a bore 212 of generally oval shape in cross section which extends through the distribution plate 202 to the lower surface thereof. The portion of the bore 212 in the upper surface of the plate 202 which extends beyond the port 132 is sealed by the base plate 133. A second passageway 214 through the plate 202 is an inclined bore which slopes partially beneath the inlet space 211 of the passageway 210, as best seen in FIG. 20.

Figure 22:
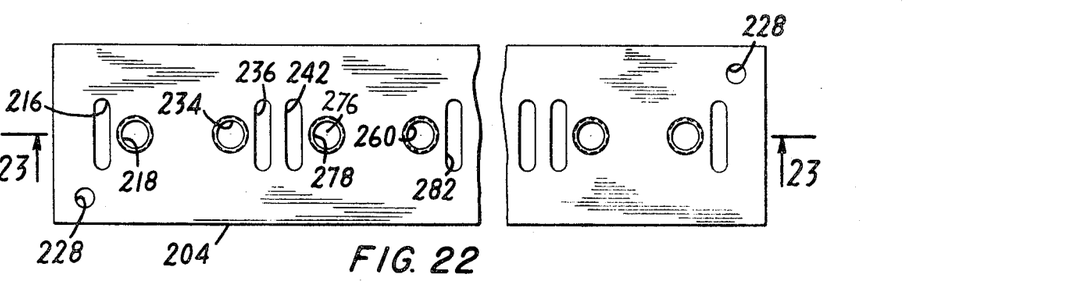
FIGS. 22 and 23 are top plan and vertical sectional views, respectively, of the middle distribution plate of FIG. 18.
Figure 23:
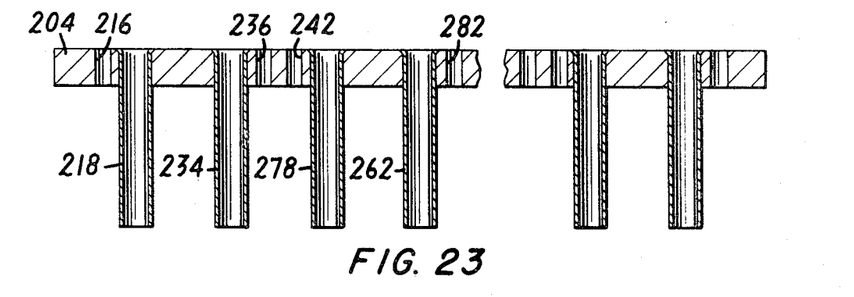

The middle plate 204 is formed with a first passageway 216 (as viewed from the left in FIGS. 22 and 23) which is of generally oval shape in cross section and which is aligned with the bore 212 of the first passageway 210 of the top plate 202. The second passageway through the middle distribution plate 204 is formed by an inner flow tube 218 which extends through the plate 204 and projects therebelow. The inner flow tube 218 communicates with the second passageway 214 of the upper plate 202.

Figure 24:
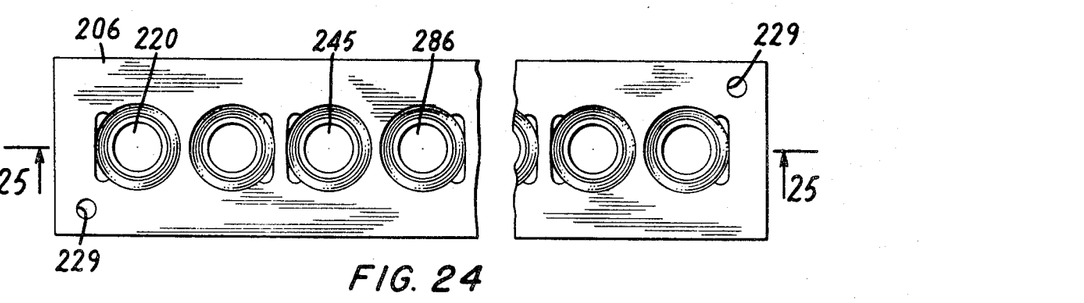
FIGS. 24 and 25 are top plan and vertical sectional respectively, of the bottom distribution plate of FIG. 18.
Figure 25:
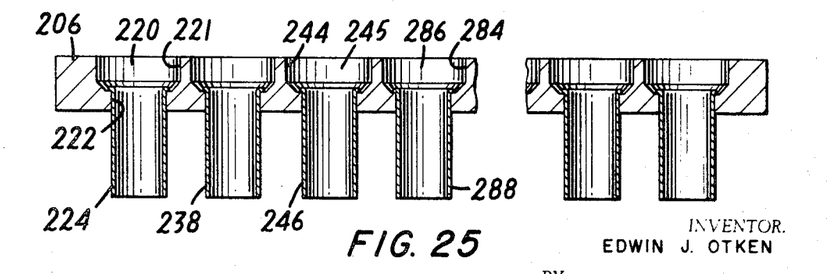

The lower distribution plate 206 (see FIGS. 24 and 25) has a first passageway 220, as viewed from the left, which includes an inlet space 221 which receives the corresponding inner flow tube 218 of the middle plate 204 and which is so shaped as to communicate with the generally oval bore 216 of the middle plate. The inlet space 221 communicates with a bore 222 of reduced diameter which receives an outer flow tube 224, which in turn projects below the lower surface of the bottom plate 206. The outer flow tube 224 is disposed externally of and concentric with the corresponding inner flow tube 218 thus providing an annular space 226 between the two flow tubes 218 and 224.

The distribution plates 202, 204 and 206 are each provided with a pair of bores 227, 228 and 229, respectively, which are adapted to slidably receive the two guide posts 144, thereby insuring that the distribution plates are properly aligned with each other and the base plate 133.

Vanilla ice cream, for example, may be supplied from the reservoir 46 through the first port 132 of the base plate 133 and thence through the first passageways 210, 216 and 220 of the distribution plates 202, 204, and 206, respectively, and then through the annular space 226 between the discharge tubes 218 and 224 to the first mold 35. At the same time, chocolate fudge may be supplied from the reservoir 48 to the second port 132 of the base plate 133 and then through the bore 214 of the plate 202 and the inner discharge tube 218 of the plate 204 to the same first mold 35. In this way, the ice cream bar formed in the first mold has an inner core of chocolate fudge surrounded by an outer layer of vanilla ice cream.

Figure 19:
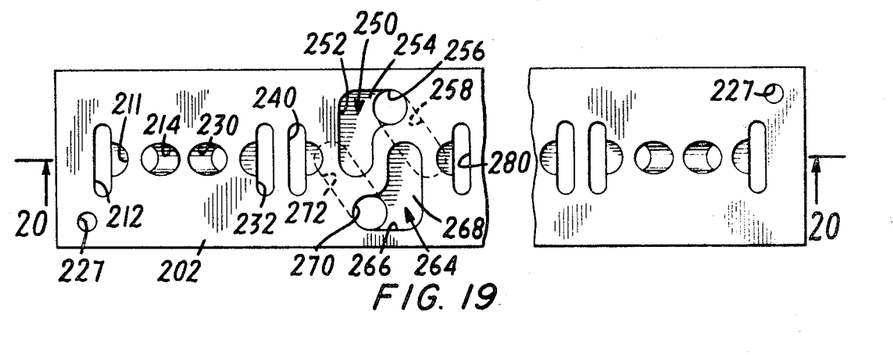
FIGS. 19, 20 and 21 are top plan, vertical sectional, and bottom views, respectively, of the top distribution plate of FIG. 18.

A third passageway 230 in the upper distribution plate 202 is an inclined bore of the same shape as the second passageway 214 inclined in the opposite direction, as best seen in FIG. 20. Similarly, a fourth passageway 232 in the plate 202 is of the same shape as the first passageway 210 but it is disposed symmetrically therewith as viewed in FIGS. 19 and 20. The passageways 230 and 232 of the plate 202 communicate with an inner discharge tube 234 and a bore 236 of the middle plate 204, respectively, which in turn are received in and communicate with a second outer discharge tube 238 of the bottom plate 206.

Strawberry fudge may be supplied from the reservoir 45 through the third port 132, the bore 230 and the inner discharge tube 234 into the second mold 35, while chocolate ice cream may be supplied from the reservoir 47 through the fourth port 132, the passageways 232 and 236 through the annular space between the discharge tubes 234 and 238. Thus an ice cream bar is formed in the second mold which has an inner core of strawberry fudge surrounded by an outer layer of chocolate ice cream.

The fifth passageway 240 through the top plate 202 is identical to the first passageway 210 and communicates through the fifth passageway 242 of the middle plate 204 with the inlet space 244 of the third passageway 245 of the bottom plate 206 which includes an outer discharge tube 246. The passageways 240, 242 and 245 are identical with the above-described passageways 210, 216, and 220, respectively.

The sixth passageway 250 through the top plate 202 includes a milled slot 252 which communicates with the sixth port 132 of the base plate 133. The slot 252 has a bottom closure wall 254 which is apertured by a bore 256 at the end of the slot opposite to that which communicates with the port 132. The bore 256 communicates with a milled slot 258 in the bottom surface of the plate 202 which has a top closure wall 260. The opposite end of the slot 258 from the end into which the bore 256 opens communicates with the seventh passageway 260 of the middle plate 204 which includes an inner discharge nozzle 262.

The seventh passageway 264 through the top plate 202 includes a milled slot 266 one end of which communicates with the seventh port 132 of the base plate 133. The slot 264 has a bottom closure wall 268 which is apertured by a bore 270 at the opposite end of the slot from that which communicates with the port 132. The bore 270 communicates with a milled slot 272 in the bottom surface of the plate 202. The slot 272 has a top closure wall 274 and communicates at the opposite end from that into which bore 270 opens with the sixth passageway 276 of the middle distribution plate 204. The passageway 276 includes an inner discharge nozzle 278.

The eighth passageway 280 of the plate 202, identical in shape with the passageway 232, communicates through the eighth passageway 282 of the middle plate 204, identical with the passageway 216 therethrough, with the inlet space 284 of the fourth passageway 286 through the bottom plate 206. The passageway 286 includes an outer discharge nozzle 288 and is identical in shape with the passageway including the discharge nozzle 238.

It is apparent that the slots 252 and 266 in the upper surface of the plate 202 are enclosed at the bottom by the bottom closure walls 254 and 268, respectively, and at the top by the base plate 133. Similarly, the slots 258 and 272 in the bottom surface of the plate 202 are enclosed at the top by the closure walls 260 and 274, respectively, and at the bottom by the middle distribution plate 204.

The disposition of the slots 140 and the distributing plate 126 and the alternating arrangement of the discharge ports 112 between the pairs of reservoirs 45 and 46, and 47 and 48 are such that the reservoir 46 is communicated with the first passageway 210 and fifth passageway 240 of the top distribution plate 202, the reservoir 48 is communicated with the second passageway 214 and sixth passageway 250, the reservoir 45 is communicated with the third passageway 230 and seventh passageway 264, and the reservoir 47 is communicated with the fourth passageway 232 and eighth passageway 280. As discussed above, the first four passageways in the top plate 202 are communicated through the inner discharge nozzles 218 and 234 and the outer discharge nozzles 224 and 238 so as to produce an ice cream bar in the first mold 35 having a chocolate fudge core surrounded by an outer layer of vanilla ice cream and an ice cream bar in the second mold having a strawberry fudge core surrounded by an outer layer of chocolate ice cream.

Vanilla ice cream introduced into the fifth passageway 240 of the top plate 202 passes through the passageway 242 of the middle plate 204 and is discharged through the annular space between the inner nozzle 278 and the outer nozzle 246 into the third mold 35. At the same time strawberry fudge introduced into the passageway 264 of the top plate 202 passes through the slot 266, the bore 270, the slot 272, and through the inner discharge tube 278 into the third mold to produce an ice cream bar having an inner core of strawberry fudge surrounded by an outer layer of vanilla ice ceam.

Chocolate fudge introduced from the sixth port 132 into the passageway 250 of the top distribution plate 202 passes through the slot 252, the bore 256, the slot 258 and through the inner discharge tube 262 into the fourth mold 35. At the same time chocolate ice cream introduced from the eighth port 132 into the passageway 280 of the top plate 202 passes through the passageway 282 of the middle plate 204 and the inlet space 284 of the bottom plate 206 and is discharged through the annular space between the inner discharge tube 262 and the outer discharge tube 288 into the fourth mold. Thus an ice cream bar is produced in the fourth mold which has an inner core of chocolate fudge surrounded by an outer layer of chocolate ice cream.

Accordingly, the distribution plates 202, 204 and 206 enable the simultaneous production of four different frozen comestibles, each of which comprises a different combination of two ingredients. The passageways through the distribution plates 202, 204 and 206 for filling the remaining ten molds 35 of a radial row of molds are the same as those for filling the first four molds and so do not require a detailed description.

Thus there is provided apparatus for simultaneously making a plurality of differing single-flavored or multi-flavored frozen comestibles. Furthermore, the apparatus is readily modified for the simultaneous production of differing single- or multi-flavored comestibles from two, three or four different edible ingredients in the embodiment illustrated. In particular, such modification is accomplished by changing the multiple orifice nozzle, comprising a plurality of stainless steel distribution plates to facilitate the cleaning thereof, which is mounted beneath the base plate 133, and disabling selected elements of the measuring dispensers, as necessary. The selection of the appropriate one of a family of multiple orifice nozzles thus permits the simultaneous production of the desired assortment of differing frozen comestibles.

Although the fundamental novel features of the invention have been shown and described, it will be understood that various substitutions, changes and modifications in the form and details of the apparatus illustrated and its manner of operation may be made by those skilled in the art without departing from the spirit of the invention. For example, an automatic freezer of the linear type could be employed rather than the rotary horizontal freezer described above. All such variations and modifications, therefore, are included within the intended scope of the invention as defined by the following claims.

I claim:

1. The apparatus for simultaneously discharging into a plurality of molds a plurality of different edible ingredients adapted by being frozen in the molds to form a plurality of differing frozen comestibles comprising a plurality of reservoir means, each reservoir means being adapted to contain a different one of the edible ingredients, means for simultaneously dispensing a predetermined amount of ingredient from each reservoir means, and means for communicating the dispensing means with the molds, the communicating means including a plurality of different distribution means, each distribution means being arranged to communicate at least some of the dispensing means with different ones of the molds so as to discharge simultaneously a different combination of ingredients into at least two of the molds and including a plurality of stacked distribution plates, each distribution plate having a plurality of apertures passing therethrough, the apertures of each distribution plate communicating with corresponding apertures in the adjacent distribution plate to form a plurality of conduits.

2. Apparatus for simultaneously discharging into a plurality of molds a plurality of different edible ingredients adapted by being frozen in the molds to form a plurality of differing frozen comestibles comprising a plurality of reservoir means, each reservoir means being adapted to contain a different one of the edible ingredients, means for simultaneously dispensing a predetermined amount of ingredient from each reservoir means, and means for communicating the dispensing means with the molds, the communicating means including a plurality of different distribution means, each distribution means being arranged to communicate at least some of the dispensing means with different ones of the molds so as to discharge simultaneously a different combination of ingredients into at least two of the molds, at least one of the distribution means communicating two of the reservoir means with each mold so as to discharge simultaneously into the molds at least two different combinations of ingredients.

3. Apparatus for discharging into a plurality of molds at least two different combinations of edible ingredients adapted by being frozen in the molds to form a plurality of differing frozen comestibles, the molds adapted to be driven past the discharge apparatus in a longitudinal direction, comprising at least three reservoir means, each reservoir means being adapted to contain a different one of the edible ingredients, means for simultaneously dispensing a predetermined amount of ingredient from each reservoir means, a first plurality of discharge tube means disposed substantially transversely of the longitudinal direction in which the molds are driven, a second plurality of discharge tube means disposed substantially transversely of the longitudinal direction in which the molds are driven the second discharge tube means being spaced longitudinally from the first discharge tube means, each of the second discharge means corresponding with a different one of the first discharge means, a first plurality of conduit means for communicating the first discharge means with the dispensing means so as to discharge a different ingredient into at least two of the molds in ingredient-receiving relation to the first discharge tube means, and a second plurality of conduit means for communicating the second discharge means with the dispensing means so as to discharge into each of the molds in ingredient-receiving relation thereto an ingredient differing from the ingredient discharged into the corresponding mold in ingredient-receiving relation to the corresponding one of the first discharge tube means, whereby the molds contain at least two different combinations of ingredients after they have been in ingredient-receiving relation to the first and second discharge tube means.

4. Apparatus for simultaneously discharging into a plurality of different edible ingredients adapted by being frozen in the molds to form a plurality of differing frozen comestibles comprising a plurality of reservoir means, each reservoir means being adapted to contain a different one of the edible ingredients, means for simultaneously dispensing a predetermined amount of ingredient from each reservoir means, and means for communicating the dispensing means with the molds, the communicating means including one of a plurality of different distribution means, each distribution means being arranged to communicate at least some of the dispensing means with different ones of the molds so as to discharge a different combination of ingredients into at least two of the molds, at least one of the distribution means communicating two of the reservoir means with each so as to discharge into the molds at least two different combinations of ingredients, the one distribution means including first conduit means for discharging a first ingredient into a first region of one mold, second conduit means for discharging a second ingredient into a second region of the one mold, third conduit means for discharging the first ingredient into the first region of a second mold, and fourth conduit means for discharging a third ingredient into the second region of the second mold.

5. The apparatus according to claim 4 wherein the one distribution means also includes fifth conduit means for discharging a fourth ingredient into the first region of a third mold, sixth conduit means for discharging the third ingredient into the second region of the third mold, seventh conduit means for discharging the fourth ingredient into the first region of a fourth mold, and eighth conduit means for discharging the second ingredient into the second region of the fourth mold.

6. Apparatus for simultaneously discharging into a plurality of molds a plurality of different edible ingredients adapted by being frozen in the molds to form a plurality of differing frozen conestibles comprising a plurality of reservoir means, each reservoir means being adapted to contain a different one of the edible ingredients, means for simultaneously dispensing a predetermined amount of ingredient from each reservoir means, and means for communicating the dispensing means with the molds, the communcating means including one of a plurality of different distribution means, each distribution means being arranged to communicate at least some of the dispensing means with different ones of the molds so as to discharge a different combination of ingredients into at least two of the molds, at least one of the distribution means communicating two of the reservoir means with each mold so as to discharge into the molds at least two different combinations of ingredients, at least one of the distribution means communicating at least two of the reservoir means with each of at least three molds so as to discharge a different combination of ingredients into at least three of the molds.

References Cited

UNITED STATES PATENTS

| | | |
|---|---|---|
| 2,032,812 | 3/1936 | Quattrin et al. |
| 2,851,198 | 9/1958 | Rasmusson ________ 141—178 X |
| 1,463,851 | 8/1923 | Smith. |
| 2,650,551 | 9/1953 | Eckels et al. |
| 2,673,675 | 3/1954 | Anderson. |
| 2,850,990 | 9/1958 | Rasmusson. |

DANIEL BLUM, Primary Examiner

U.S. Cl. X.R.

222—145; 107—8